United States Patent [19]

Chen

[11] Patent Number: 5,360,225
[45] Date of Patent: Nov. 1, 1994

[54] FOLDABLE BICYCLE FRAME

[76] Inventor: Robert W. P. Chen, No. 5, Hwang Pou Village, Fuhsing Hsiang, Chang Hua,

[21] Appl. No.: 93,680

[22] Filed: Jul. 20, 1993

[51] Int. Cl.$^5$ .......................... B62K 15/00; B62K 3/16
[52] U.S. Cl. ...................................... 280/278; 280/287
[58] Field of Search ............ 280/278, 274, 287, 281.1, 280/230

[56] References Cited

U.S. PATENT DOCUMENTS

| | | |
|---|---|---|
| 693,521 | 2/1902 | Ishöy ................................. 280/287 |
| 1,584,568 | 5/1926 | Clark ................................. 280/278 |
| 3,876,231 | 4/1975 | Geisel ................................ 280/278 |
| 4,579,360 | 4/1986 | Nishimura et al. ............... 280/287 |
| 4,900,047 | 2/1990 | Montague et al. ............... 280/287 |
| 4,995,626 | 2/1991 | Montague ......................... 280/278 |
| 5,135,246 | 8/1992 | Montague ......................... 280/278 |
| 5,205,573 | 4/1993 | Mhedhbi ........................... 280/278 |
| 5,222,751 | 6/1993 | Chen ................................. 280/278 |
| 5,282,639 | 2/1994 | Chen ................................. 280/287 |

FOREIGN PATENT DOCUMENTS

| | | |
|---|---|---|
| 497510 | 8/1992 | European Pat. Off. ............ 280/287 |
| 283586 | 11/1990 | Japan ................................. 280/278 |
| 25563 | of 1897 | United Kingdom ............... 280/278 |

Primary Examiner—Kenneth R. Rice
Assistant Examiner—Kevin Hurley
Attorney, Agent, or Firm—Browdy and Neimark

[57] ABSTRACT

A foldable bicycle frame comprises a front frame made up of a head tube, a top tube and a down tube, and a rear frame made up of a seat tube, a bottom bracket tube, a seat stay and a chain stay. The top tube is provided at the rear end thereof with a connection tube to receive therein a seat post. The bottom bracket tube is provided at the center of the front end thereof with an extension tube which faces the front wheel and is pivoted at the front end thereof to the bottom end of the down tube. The front frame and the rear frame are fastened together by means of the seat post which is inserted into the connection tube and the seat tube. The front frame and the rear frame are rotatable in relation to each other when the seat post is pulled out of the seat tube.

4 Claims, 4 Drawing Sheets

FOLDABLE BICYCLE FRAME

FIELD OF THE INVENTION

The present invention relates to a foldable bicycle frame, and more particularly to the folding and the fastening structures of the foldable bicycle frame.

BACKGROUND OF THE INVENTION

A foldable bicycle is different from a non-foldable bicycle in that the former has a frame that can be folded to reduce its length and volume so as to facilitate its storage and transportion. The prior art foldable bicycle frame is provided at an appropriate location thereof with a joint permitting the frame to be folded in such a manner that the front wheel and the rear wheel are arranged side by side or near to each other. It is expensive to build a foldable bicycle in view of the fact that the foldable bicycle has a folding joint of complex construction and vulnerable to becoming loosened. For this reason, the frame of the foldable bicycle is relatively less able to withstand a percussive force. With a view to overcoming such a structural deficiency of the prior art foldable bicycle frame, this applicant has disclosed a number of improved foldable bicycle frames, as exemplified in a U.S. Pat. No. 5,222,751. However, such improved frames disclosed by this applicant are by no means free from the structural deficiency.

SUMMARY OF THE INVENTION

It is therefore the primary objective of the present invention to provide a foldable bicycle frame with a lower rotating point having a great structural strength enabling to facilitate the manufacture and the assembly of the foldable bicycle.

It is another objective of the present invention to provide a foldable bicycle frame, which can be so fastened securely that it will not loosen.

In keeping with the principles of the present invention, the foregoing objectives of the present invention is attained by a foldable bicycle frame, which comprises a front frame made up of a head tube, a top tube and a down tube, and a rear frame made up of a seat tube, a bottom bracket tube, a seat stay and a chain stay. The rear frame is provided with an extension tube located in front of the bottom bracket tube and pivoted at the front end thereof to the rear end of the down tube.

DETAILED DESCRIPTION OF THE INVENTION

Figure 1:
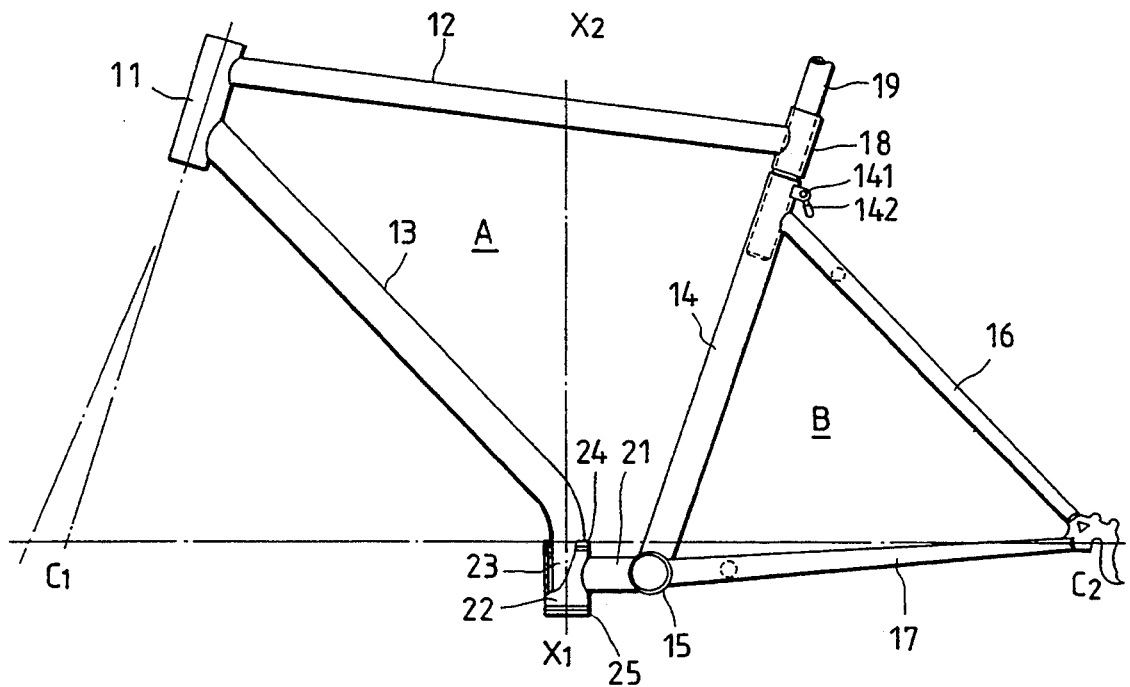
FIG. 1 shows a side elevational view of a first preferred embodiment of the present invention.
Figure 2:
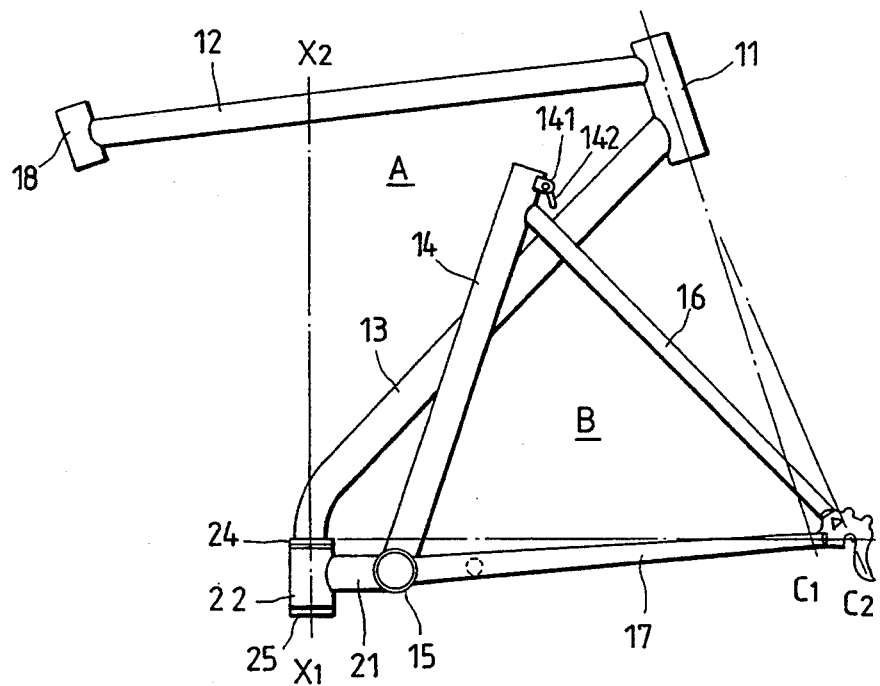
FIG. 2 shows a schematic view of the folded first preferred embodiment as shown in FIG. 1.

Referring to FIGS. 1 and 2, the foldable bicycle frame of the present invention is shown to comprise a front frame (A) made up of a head tube 11, a top tube 12 and a down tube 13, and a rear frame (B) made up of a seat tube 14, a bottom bracket tube 15, a seat stay 16 and a chain stay 17. The top tube 12 is provided at the rear end thereof with a connection tube 18 which is located on the end of the seat tube 14. A seat post 19 is fitted into the connection tube 18 and the seat tube 14. In other words, the seat post 19, the connection tube 18 and the seat tube 14 are disposed coaxially and securely by means of a bolt 142 which locks a lug 141 disposed on a side of the seat tube 14. The bottom bracket tube 15 is provided at the center of the front end thereof with an extension tube 21 facing the front wheel and having an axial tube 22 with a center line X1–X2 perpendicular to a connection line between the front wheel center C1 and the rear wheel center C2. The down tube 13 is provided at rear end thereof with an axial rod 23 having a center line coinciding the center line X1–X2. The axial rod 23 is provided respectively at both ends thereof with bushings 24 and 25 capable of rotating freely in the axial tube 22. The bottom end of the down tube 13, namely the bottom end of the axial rod 23, is fastened with the bushing 25 and is rotatable in relation to the axial tube 22 without becoming disengaged with the axial tube 22.

As shown in FIG. 1, the seat post 19 is inserted into the connection tube 18 and the seat tube 14 and is fastened by means of the bolt 142 locking the lug 141 which in turn holds securely the seat post 19. As a result, the front frame A is fastened securely with the rear frame B. The folding of the front frame A and the rear frame B is illustrated in FIG. 2. Before the frames are ready to be folded, the bolt 142 must be first loosened to allow the seat post 19 to be pulled out of the seat tube 14, thereby permitting the front frame A and the connection tube 18 to be turned for about 180 degrees on the axial rod 23 or the center line X1–X2 serving as an axial center. As a result, the front wheel center C1 and the rear wheel center C2 can be brought together to complete the process of folding the foldable bicycle frame of the present invention.

The foldable bicycle frame of the present invention described above is similar in structure to any non-foldable bicycle frame. However, the foldable bicycle frame of the present invention can be built easily and folded with ease and speed. It must be noted here that the manner in which the axial rod 23 and the axial tube 22 are pivoted may include the head set of the head tube 11 and the fork (not shown in the drawing).

Figure 3:
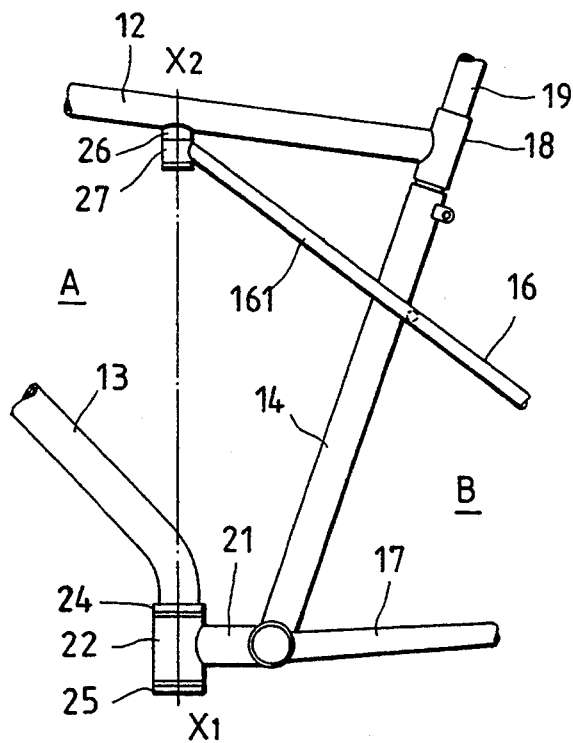
FIG. 3 shows a partial schematic view of a second preferred embodiment of the present invention.

As shown in FIG. 3, the second preferred embodiment of the present invention is generally similar to the first preferred embodiment. The second embodiment also has a top tube 12, a down tube 13, a seat tube 14, a bottom bracket tube 15, a seat stay 16, a chain stay 17, a connection tube 18, a seat post 19, an extension tube 21, an axial tube 22, and bushings 24 and 25. However, the second embodiment has an axial rod 26 disposed on the center line X1–X2 and located at the bottom end of the top tube 12. The axial rod 26 is rotatably fitted into an axial tube 27 which is rotatable in relation to the axial rod 26. The front end 161 of the seat stay 16 is disposed beyond the front end of the seat tube 14 and fastened to the rear end of the axial tube. As a result, the front frame A and the rear frame B are pivoted by means of the upper axial tube 27 and the lower axial tube 22 so as to enhance the structural strength of the bicycle suitable for use in riding on a rough road.

Figure 4:
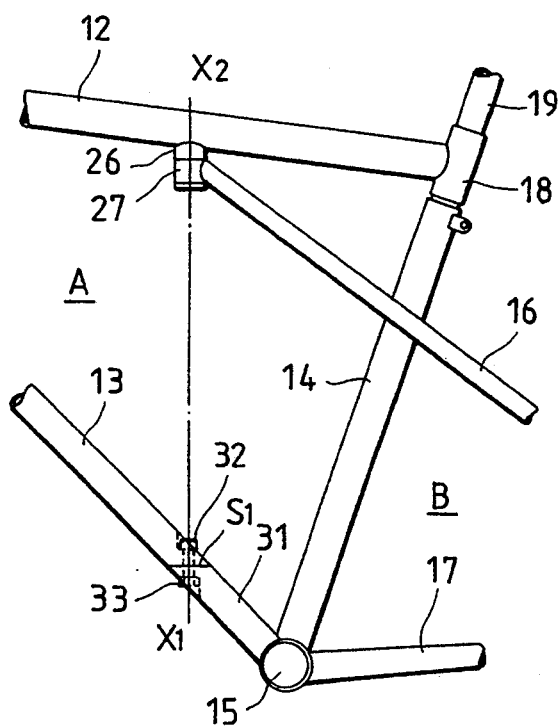
FIG. 4 shows a partial schematic view of a third preferred embodiment of the present invention.

As shown in FIG. 4, the third embodiment of the present invention has a top tube 12, a down tube 13, a seat tube 14, a bottom bracket tube 15, a seat stay 16, a chain stay 17, a connection tube 18, a seat post 19, an axial rod 26 and an axial tube 27. However, the third embodiment comprises an extension tube 31 which is located in alignment with the down tube 13. The connecting face S1 of the extension tube 31 and the down tube 13 is perpendicular to the center line X1-X2. A bolt 32, which is located on the center line X1-X2, is put through the connecting end of the down tube 13 and the extension tube 31. A nut 33 is used to fasten the bolt 32. As a result, the down tube 13 and the extension tube 31 can be rotated on the bolt 32 serving as an axial center. Therefore, the front frame A and the rear frame B of the third embodiment can be folded and unfolded.

Figure 5:
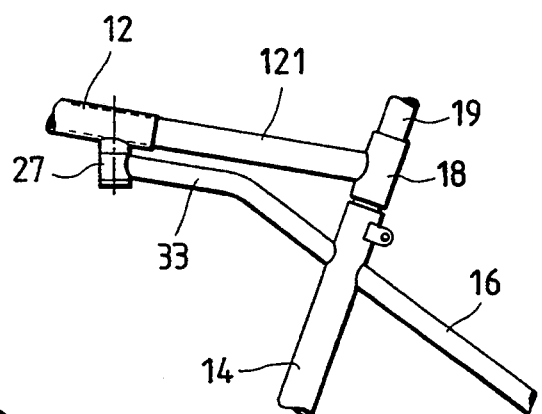
FIG. 5 shows a partial schematic view of a fourth preferred embodiment of the present invention.

The fourth embodiment of the present invention is illustrated in FIG. 5, in which the frame is shown to comprise a top tube 12, a seat tube 14, a seat stay 16, a connection tube 19, a seat post 19, an axial tube 27, etc. However, the seat stay 16 has a front end that is welded with the rear end of the seat tube 14. There is a reinforced tube 33 which has one end that is welded with the seat tube 14 and which has another end that is welded with the axial tube 27. Located between the top tube 12 and the connection tube 18 is an inner tube 121, which has a rear end that is fastened securely with the connection tube 18 and a front end that is inserted into the top tube 12 in such a manner that the front end of the inner tube 121 can be pushed further into the top tube 12 at the time when the foldable bicycle of the present invention is folded.

Figure 6:
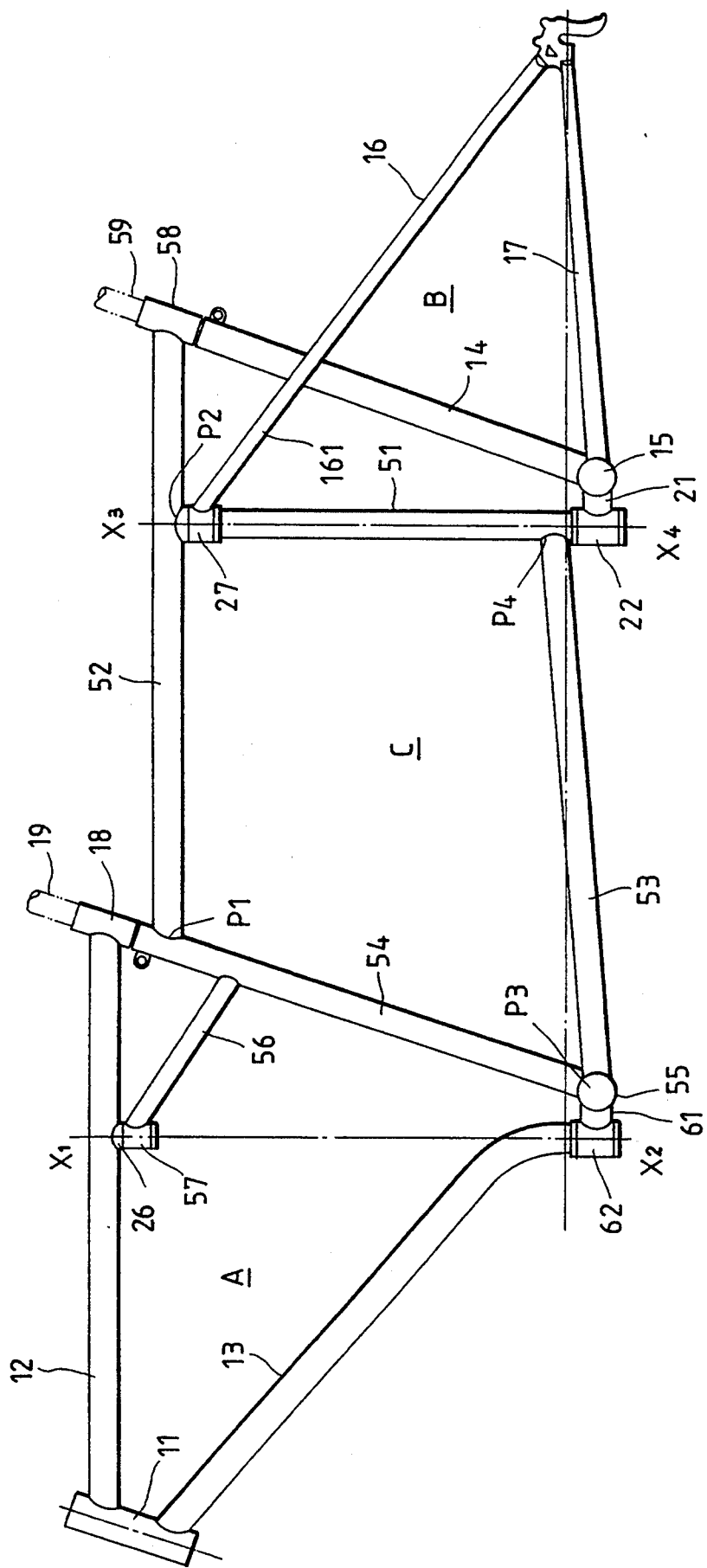
FIG. 6 shows a partial schematic view of an fifth preferred embodiment of the present invention.
Figure 7:
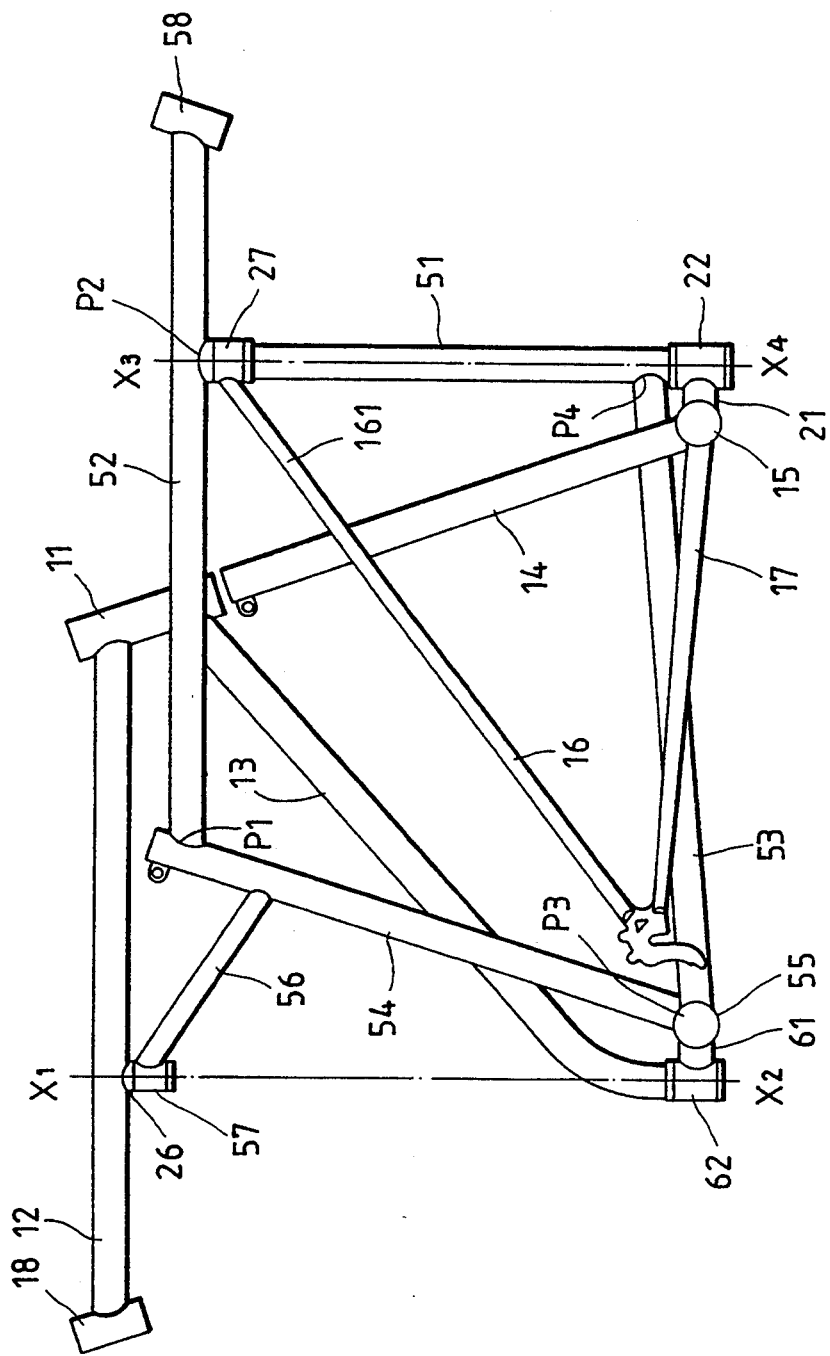
FIG. 7 is a schematic view showing the folded frame of the fifth preferred embodiment as shown in FIG. 6.

As shown in FIGS. 6 and 7, a tandem bicycle of the present invention is composed of a front frame A and a rear frame B. Both frames A and B are made up of the components which are similar in structure to those of the second preferred embodiment of the present invention as shown in FIG. 3, with the difference being that the tandem bicycle comprising a middle frame C disposed between the frames A and B. The middle frame C comprises a long axial rod 51, a second top tube 52, a second down tube 53, a second seat tube 54 and a second bottom bracket tube 55, which are welded together at the points P1, P2, P3 and P4 so as to form a tetragonal structure. A reinforcing tube 56 has one end that is welded to the second seat tube 54 and another end that is welded to an axial tube 57 which is in turn pivoted to the axial rod 26 of the front frame A. The second top tube 52 is provided at the rear end thereof with a second connection tube 58 fastened to the top end of the first seat tube 14. A second seat post 59 can be inserted securely into the second connection tube 58 and the first seat tube 14. The bottom bracket tube 55 is fastened at the front edge thereof with an extension tube 61 and an axial tube 62. The bottom bracket tube 55 is pivoted to the bottom end of the down tube 13 of the front frame A by means of the axial tube 62. The long axial rod 51 has an axis X3-X4, which is parallel to the axis X1-X2 of the front frame A. The axial tube 27 fastened to the front end of the seat stay 16 of the frame B and the axial tube 22 fastened to the front end of the extension tube 21 are pivoted respectively to the upper and the lower ends of the long axial rod 51. The tandem bicycle of the present invention further comprises two bottom bracket tubes 15 and 55, and two seat posts 19 and 59 so that the bicycle is provided with two seats and sets of pedals placed tandem. In the process of folding the tandem bicycle of the present invention, the seat posts 19 and 59 are pulled out of the connection tubes 18 and 58 so that the front frame A can be rotated on the axis X1-X2 in relation to the middle frame C. In the meantime, the rear frame B can be rotated on the axis X3-X4 in relation to the middle frame C, as shown in FIG. 7.

It must be noted here that the middle frame C of the tandem bicycle described above is assembled in a way similar to that of other preferred embodiments of the present invention. As a result, the front and the rear frames A and B can be joined together to form a bicycle for one person to ride thereon. It is apparent that the tandem bicycle of the present invention is highly versatile.

The embodiments of the present invention described above are to be regarded in all respects as merely illustrative and not restrictive. Accordingly, the present invention may be embodied in other specific forms without deviating from the spirit thereof. Therefore, the present invention is to be limited only by the scope of the following appended claims.

What is claimed is:

1. A foldable bicycle frame comprising a front frame and a rear frame which are pivoted to each other, and a seat tube located between said front frame and said rear frame, a connection tube being provided over top of said seat tube, the front end of said rear frame being fastened with the seat tube; an inner tube having a rear end fastened with the connection tube and a front end inserted into a top tube of said front frame, said front frame and said rear frame being capable of rotating in relation to each other at the time when a seat post is pulled out of said seat tube, and wherein the inner tube can be pushed further into the top tube when the frame is folded.

2. A foldable bicycle frame comprising a front frame and a rear frame which are pivoted to each other, said front frame having a top tube with a connection tube fastened to a rear end thereof and located over the top of a seat tube of said rear frame, said front frame being provided with a down tube being separated from said top tube and having a rear end curving downwards to form an axial rod which is perpendicular to the center line of front wheel and rear wheel of a foldable bicycle, said axial rod being fitted pivotally into an axial tube located in front of a bottom bracket of said rear frame, said front frame and said rear frame being rotatable in opposite directions on said axial rod.

3. The foldable bicycle frame of claim 2 wherein said top tube of said front frame is provided with an axial rod fitted pivotally into an axial tube located at front end of a reinforced tube; and wherein said seat tube of said rear frame is fastened with a rear end of said reinforced rod.

4. A foldable bicycle frame comprising a middle frame disposed between a front frame and a rear frame and provided with a second top tube, a second seat tube, a second down tube, and a second bottom bracket tube, said second seat tube being located under a connection tube of said front frame and provided with pivoting elements enabling said middle frame to be so pivoted respectively to said top tube and said down tube so that said front frame can be rotated in relation to said middle frame, said second top tube of said middle frame being provided at a rear end thereof with a connection tube located over said seat tube, said second top tube and said second down tube being pivoted respectively at a rear end thereof to said rear frame such that said rear frame can be rotated in relation to said middle frame, wherein said middle frame is provided with a long axial rod disposed securely between said second top tube and said second down tube in such a manner that said long axial rod is perpendicular to a center line of a front wheel and a rear wheel, and that an upper end and a lower end of said long axial rod are pivoted respectively to said rear frame.

* * * * *